(12) United States Patent
Shama et al.

(10) Patent No.: US 11,327,826 B1
(45) Date of Patent: May 10, 2022

(54) SYSTEM, METHOD, AND COMPUTER PROGRAM FOR AUTOMATED RESOLUTION OF FREE-TEXT INCIDENTS, BASED ON MACHINE LEARNING

(71) Applicant: Amdocs Development Limited, Limassol (CY)

(72) Inventors: Gilli Shama, Ra'anana (IL); Uri Weissler, Raanana (IL); Yaniv Avrashi, Petach Tikva (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 531 days.

(21) Appl. No.: 15/886,240

(22) Filed: Feb. 1, 2018

(51) Int. Cl.
G06F 11/07 (2006.01)
H04L 41/5074 (2022.01)
G06N 20/00 (2019.01)
G06F 16/35 (2019.01)
G06F 40/205 (2020.01)

(52) U.S. Cl.
CPC .......... *G06F 11/0793* (2013.01); *G06F 16/35* (2019.01); *G06F 40/205* (2020.01); *G06N 20/00* (2019.01); *H04L 41/5074* (2013.01)

(58) Field of Classification Search
CPC combination set(s) only.
See application file for complete search history.

(56) References Cited

U.S. PATENT DOCUMENTS

| | | | |
|---|---|---|---|
| 8,527,542 B2 | 9/2013 | Haeberle et al. | |
| 9,225,834 B2 | 12/2015 | Chan et al. | |
| 9,386,041 B2 | 7/2016 | Carver et al. | |
| 9,542,259 B1 | 1/2017 | McEwen et al. | |
| 9,697,352 B1 | 7/2017 | Armstrong | |
| 9,762,607 B2 | 9/2017 | Satish et al. | |
| 10,346,851 B1* | 7/2019 | Kapoor | G06F 16/9024 |
| 2013/0041958 A1* | 2/2013 | Post | G06Q 10/103 709/206 |
| 2013/0204650 A1* | 8/2013 | Sabharwal | G06Q 30/016 705/7.13 |
| 2015/0039521 A1 | 2/2015 | Schubert et al. | |
| 2017/0063926 A1 | 3/2017 | Rogers et al. | |
| 2017/0097861 A1* | 4/2017 | Claypool, III | G06F 11/079 |
| 2018/0260760 A1* | 9/2018 | Srivastava | G06N 5/04 |
| 2019/0132191 A1* | 5/2019 | Mann | H04L 41/147 |

FOREIGN PATENT DOCUMENTS

EP 1787458 A2 5/2007

* cited by examiner

*Primary Examiner* — Arif Ullah
(74) *Attorney, Agent, or Firm* — Zilka-Kotab, P.C.

(57) ABSTRACT

A system, method, and computer program product are provided for automated resolution of free-text incidents, based on machine learning. In operation, a system receives incident information from at least one IT service management (ITSM) system. The system reads the incident information including free text and classifies an incident associated with the incident information to at least one automation flow. The system generates robotic process automation (RPA) compatible information from the incident information by parsing parameters associated with the incident from text into required fields based on the at least one automation flow. Further, the system sends the generated RPA compatible information to the at least one ITSM system or at least one RPA system.

16 Claims, 5 Drawing Sheets

SYSTEM, METHOD, AND COMPUTER PROGRAM FOR AUTOMATED RESOLUTION OF FREE-TEXT INCIDENTS, BASED ON MACHINE LEARNING

FIELD OF THE INVENTION

The present invention relates to incidents and IT service management (ITSM), and more particularly to automated resolution of free-text incidents, based on machine learning.

BACKGROUND

Operations such as information technology (IT) operations in a large telecommunications company, or a help desk at a hospital, involve incidents resolution. Incidents are managed and tracked in an IT Service Management (ITSM) system. Robotic Process Automation (RPA) assists service teams in resolving actions related to incidents automatically.

Currently, incidents in ITSM systems require human intervention to be transferred properly to RPA systems. Such intervention is time consuming and is prone to human error.

There is thus a need for addressing these and/or other issues associated with the prior art.

SUMMARY

A system, method, and computer program product are provided for automated resolution of free-text incidents, based on machine learning. In operation, a system receives incident information from at least one IT service management (ITSM) system. The system reads the incident information including free text and classifies an incident associated with the incident information to at least one automation flow. The system generates robotic process automation (RPA) compatible information from the incident information by parsing parameters associated with the incident from text into required fields based on the at least one automation flow. Further, the system sends the generated RPA compatible information to the at least one ITSM system or at least one RPA system.

DETAILED DESCRIPTION

Figure 1:
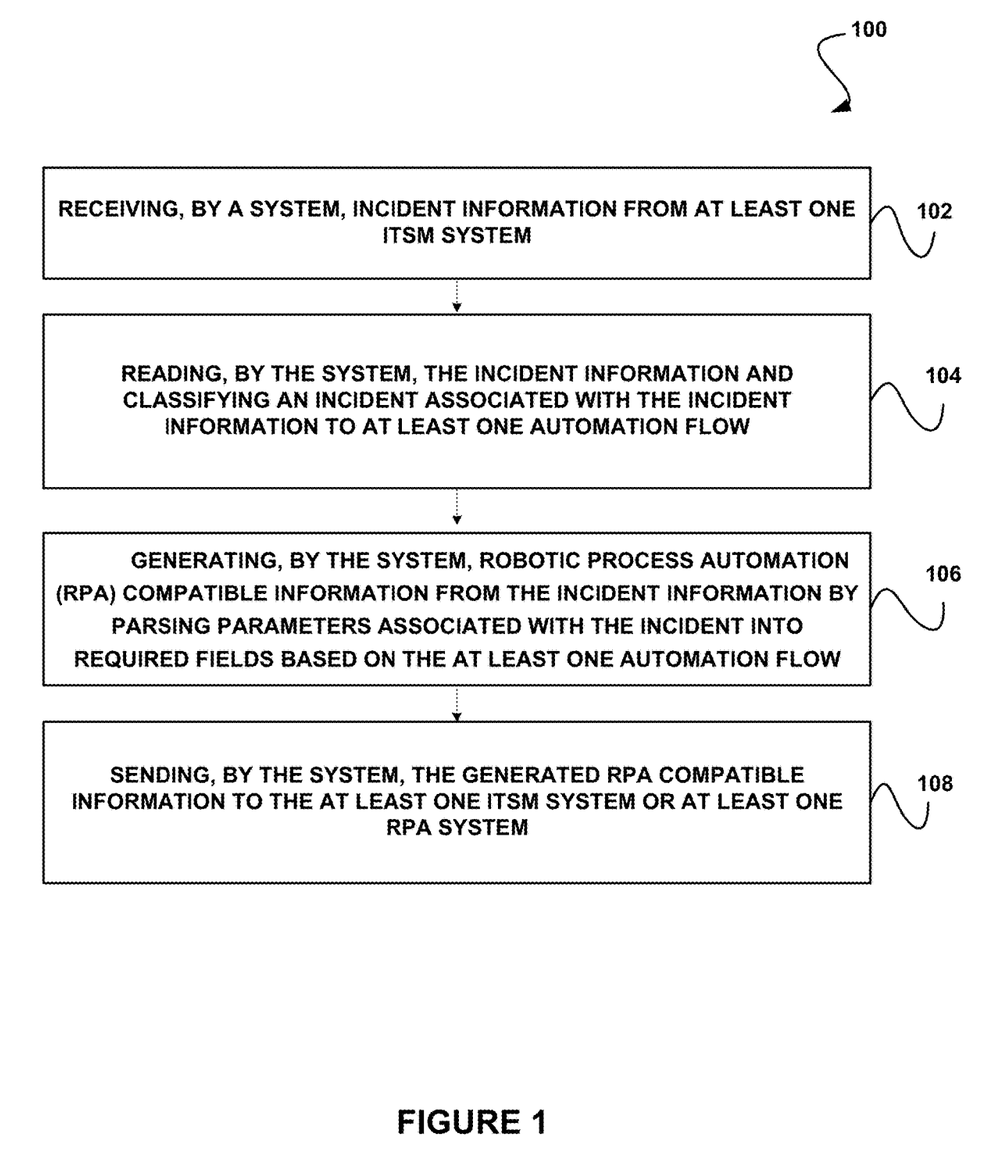
FIG. 1 illustrates a method for automated resolution of free-text incidents, based on machine learning, in accordance with one embodiment.

FIG. 1 illustrates a method 100 for automated resolution of free-text incidents, based on machine learning, in accordance with one embodiment.

In operation, a system receives incident information from at least one IT Service management (ITSM) system. See operation 102. The ITSM system may be associated with any industry. For example, in one embodiment, the ITSM system may be associated with the telecommunication industry or the medical industry. Additionally, the incident information may include various information, such as free text describing the incident including an incident summary and incident details, and/or an incident identifier, etc. The incident may be associated with any type of incident, such as a billing issue, a product issue, a service issue, etc.

The system reads the incident information and classifies an incident associated with the incident information to at least one automation flow. See operation 104. The automation flow may include any rule based flow capable of being utilized in the course of robotic program automation (RPA). The incident may be classified to the automation flow based on a classification code. In this case, the classification code may be calculated based on machine learning, and may combine Natural Language Processing (NLP) to handle text, can be in various languages, and at least one classification method. More information associated with calculating the automation flow in accordance with one embodiment may be found in the details associated with FIG. 2.

The system generates RPA compatible information from the incident information by parsing parameters associated with the incident from text into required fields based on the at least one automation flow. See operation 106. The RPA compatible information may include the automation flow with values/parameters and/or any other information capable of being used by an RPA process/system.

Further, the system sends the generated RPA compatible information to the ITSM system or at least one RPA system. See operation 108. Thus, based on various implementations, the RPA compatible information may be sent to the ITSM system and/or an RPA system It should be noted that the method 100 may be implemented utilizing various systems, hardware, software, applications, user interfaces, etc., as dictated by the implementer. For example, the system implementing the method 100 (e.g. the interpreter system 204 of FIG. 2, etc.) may include one or more processors, databases, etc., as well as implement various logic, computer code, applications, and/or user interfaces, etc. In one embodiment, the system may expanded to handle masked or tokenized textual data to cater to highly data-sensitive environments.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
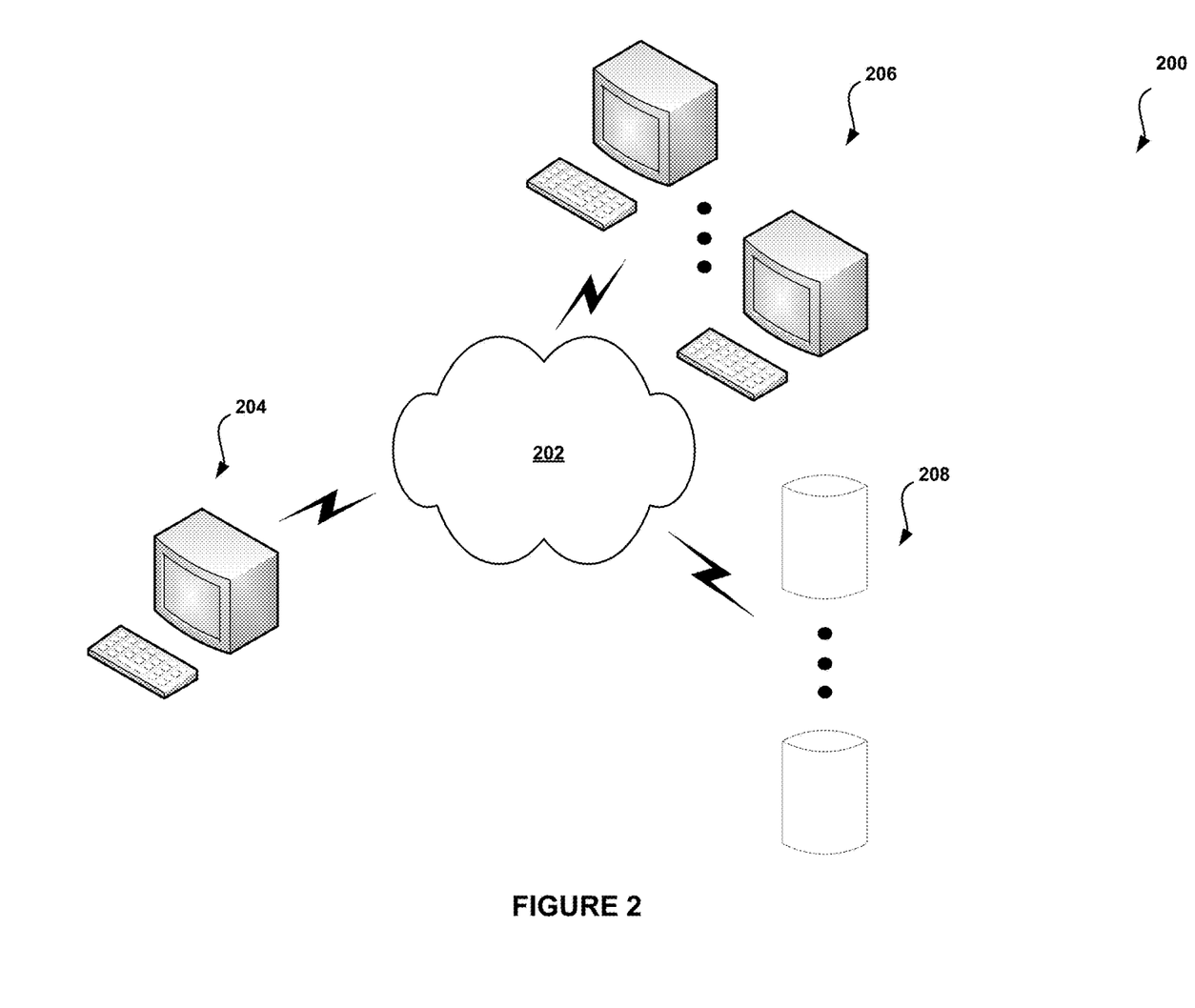
FIG. 2 shows a system for automated resolution of free-text incidents, based on machine learning, in accordance with one embodiment.

FIG. 2 shows a system 200 for automated resolution of free-text incidents, based on machine learning, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an interpreter system 204, which may implement a variety of applications or software, etc. The system 204 may be capable of communicating with a plurality of systems 206, either directly or over one or more networks 202, for performing automated resolution of free-text incidents. The system 204 may also be in communication with one or more repositories/databases 208. The systems 206 may include various telecommunication systems, such as one or more ITSM systems and/or one or more RPA systems, etc.

The system 204 enables a zero touch resolution of incidents in the ITSM system by transferring them correctly to the RPA without the need for any human intervention. In one embodiment, the system 204 may be implemented as a solution that combines an ITSM system, RPA, and interpreter. Of course, in one embodiment, the system 204 may operate as a standalone interpreter system, etc.

The unique incidents interpreter implemented by the system 204 classifies incidents from an ITSM system by interpreting free-text descriptions into flows that are available in the RPA system, and also extracting the parameters required to run the RPA flow. The incidents interpreter implemented by the system 204 is based on machine learning (supervised or semi-supervised) and natural language processing (NLP) algorithms, and thus is generic with no need to program per each specific given flow.

The system 204 turns incident resolutions from a solution that includes automation into a zero-touch end to end incident resolution. The system 204 therefore may have a large impact on shortening incident resolution time, and may also impact the cost of incident resolution and improve resolution quality. The system 204 offers a zero touch incident resolution solution that includes an interpreter that does not require a user to insert incident information in a restricted format or demand new programming for new automation flows that are added to the solution. The system 204 may utilize any human language.

In operation, the system 204 receives an incident from the ITSM system, classifies it to an automation flow, according to the automation flow it parses out values to required fields, and finally returns the findings to the ITSM system (or an RPA system). In one embodiment, the ITSM system may trigger the RPA for the given flow and values. In another embodiment, the system 204 may bypass the ITSM system and trigger the RPA directly.

The system 204 performs the classification of incidents to automation flows by machine learning. Additionally, the system 204 may utilize a lexicon approach for parsing.

With respect to the classification of incidents to automation flows by machine learning, the interpreter system 204 may receive (in real time) an incident from an ITSM system via an application programming interface (API). In one embodiment, the system 204 may classify the incident to an automation flow based on a classification code. In this case, the classification code may be calculated offline in batch, based on machine learning (e.g. or by semi-supervised machine learning, etc.).

In one embodiment, the machine learning classification model implemented by the system 204 may receive as an input history of n incidents: $X=(x_1, x_2, x_3, \ldots, x_n)$. In this case, the incidents history X may include ticket information from the ITSM system including ticket ID as well as free text fields, for example, incident summary and incident details. Another input to the modeling may be human labeling of the n historic incidents to m automation resolution flows: $Y_{n \times m}$, where for incident i and a flow j:

$$y_{i,j} = \begin{cases} 1 & \text{Incident } i \text{ can be solved by flow } j \\ 0 & \text{Otherwise} \end{cases}$$

The machine learning model construction may be performed in steps. First, NLP procedures (for example lemmatizing) may be used to produce from X a vector representation of the documents—X*, taking into account how many times a word root/token or a phrase appears in a textual field and the frequency on other documents. Second, the "bag of words" for the textual fields X* may be reduced using a dimensionality reduction code, and further reduced with other fields to be considered, yielding X. Third, X may be used as an input to a standard classification model, such as random forest or deep learning, combination of several classification machine learning algorithms, or combination of machine learning algorithms with rule-based classification etc., with the predicted labeled tickets: Y.

For the modeling, based on the machine learning described above, an algorithm may be coded, and may be used to predict a new incident $x_k$ the vector of probabilities to match each flow: $\hat{p}_k=(p_1, p_2, p_3, \ldots p_m)$, where $\hat{p}_{ki}$ is the predicted probability that $x_k$ will match flow i. For each flow there may be a confidence level $c_i$ that is defined as a solution parameter. The system 204 matches $x_k$ to flow j, with maximum probability from all flows with a probability above the confidence level:

$$\hat{y}_k = \max_{i=i..m}(p_i | p_i > c_i).$$

With respect to using a lexicon approach for parsing, the interpreter system 204 may receive, in real time, an incident and classify the incident to an automation flow, as described above. Each automation flow has parameters (e.g. mandatory and optional) for performing the automation processes. For example, a flow to retrieve cellular detailed usage may have parameters of report start and end date, as well as the requested phone number(s) and type of data used. In one embodiment, the interpreter system 204 may obtain for an identified flow the required parameters from a reference table. The interpreter system 204 may then parse values from text for each required parameter.

Values to parameters can be extracted from a given text found in the ITSM system's textual fields or in attached textual files (i.e. .txt, .xlsx, .docx) provided along with the incident, using pattern matching methods (such as regular expressions) and various semantic rules. Parameter parsing from provided textual files enables bulk execution of requests with no human intervention. However, for projects in the same disciplinary domain there are many common parameters with some variations from one project to another. For example, in the communication market a parameter of phone number is very common, it is a set of numbers that may have a common prefix, and may have hyphen, parenthesis or other special characters in specific location between digits. Phone numbers with preceding given words, such as "exclude" may be ignored.

In one embodiment, the interpreter system 204 may be utilized for incidents associated with communication service providers. In this case, the solution may be based on defining a generic lexicon with value parsing atom functions that parse parameters that are common to communication service providers' incidents. The atoms on the lexicon are generic and can be used in various providers with different setups.

In case that parsing of a value to a parameter fails, the interpreter system 204 may return a missing value result to that parameter. If the parameter is mandatory, then the ITSM system may request a user to provide the required value.

In one embodiment, the system 204 may be implemented as a semi-automated resolution. For example, in various embodiments, the system 204 may allow for: 1) involvement of human service desk feedback in case of a medium probability in classification; 2) auto triage to both dispatch incidents of manual resolution to the correct group, and to automatically perform preliminary actions per the incident type; and/or 3) ongoing classification improvement with semi-supervised machine learning.

In one embodiment, with respect to involving human service desk feedback in case of a medium probability in classification and the classification mentioned above for a new incident, $x_k$ a vector of probabilities to match each flow is calculated: $\hat{p}_k = (p_1, p_2, p_3, \ldots p_m)$, where $\hat{p}_{ki}$ is the predicted probability that $x_k$ will match flow i. For each flow there may be a confidence level $c_i$ that is defined as a solution parameter. The system 204 may match $x_k$ to flow j, with maximum probability from all flows with probability above the confidence level:

$$\hat{y}_k = \max_{i=i..m}(p_{ki}|p_{ki} > c_i).$$

This may be further expanded to double confidence levels: c.high$_i$ and c.low$_i$. An incident with highest probability above c.high$_i$ may be directed by the ITSM system to a zero touch resolution by the RPA. An incident with all probabilities below c.low$_i$ may be directed by the ITSM system for manual resolution. Other incidents may be directed by the ITSM system for human approval, to confirm whether to proceed with the highest recommended automatic resolution or to solve manually. For example:

Resolution method for incident $x_k =$
$$\begin{cases} \text{Manual} & \{\forall\, i,\, p_{ki} < c.low_1\} \\ \text{Zero} - \text{toach} & \{\exists\, i,\, p_{ki} > c.high_i\} \\ \text{Per human approval} & \text{Other} \end{cases}$$

Thus, the interpreter system 204 may function as a connector between the free texts of the incident to an RPA. An RPA is rule based automation that carries a process over systems, and that needs to be triggered given specific parameters or template. The interpreter system 204 may trigger an RPA that will perform the dedicated process. The interpreter system 204 may receive free text and extract a template from it, providing the template to the RPA.

Figure 3:
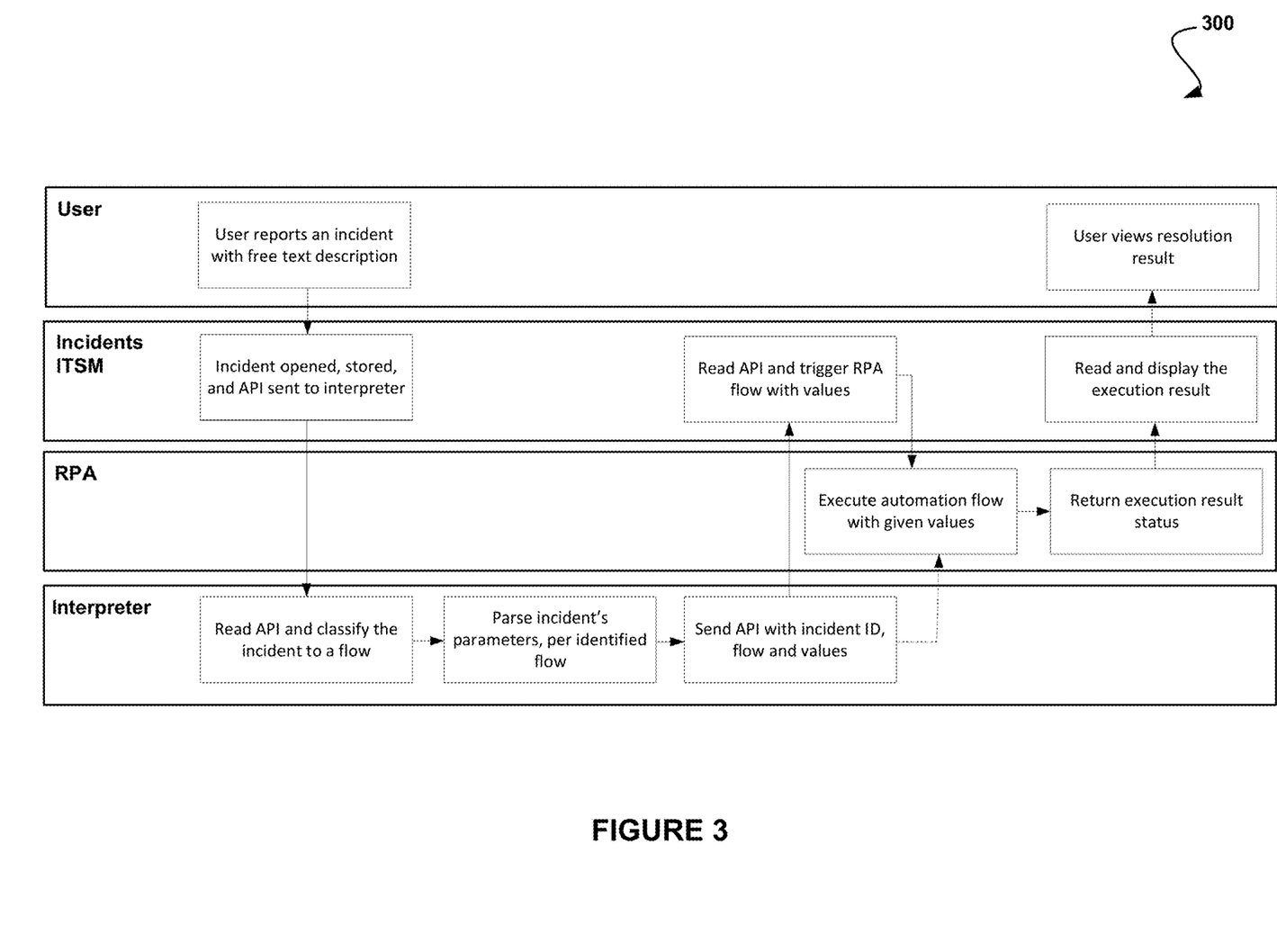
FIG. 3 shows a system flow diagram for automated resolution of free-text incidents, based on machine learning, in accordance with one embodiment.

FIG. 3 shows a system flow diagram 300 for automated resolution of free-text incidents, based on machine learning, in accordance with one embodiment in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

As shown, a user reports an incident with a free text description. An incident is opened, stored, and an API is sent to the interpreter system by an ITSM system. The interpreter system reads the API and classifies the incident to a flow. Additionally, the interpreter system parses the incident's parameters, per the identified flow. The interpreter system then sends the API with an incident ID, flow, and values to an RPA system or the ITSM system (e.g. depending on the embodiment/implementation, etc.).

The ITSM system reads the API and triggers the RPA flow with values. The RPA system executes the automation flow with the given values. The RPA system then returns the execution result status to the ITSM system. The ITSM system reads and displays the execution result. The user may then view the resolution result.

Figure 4:
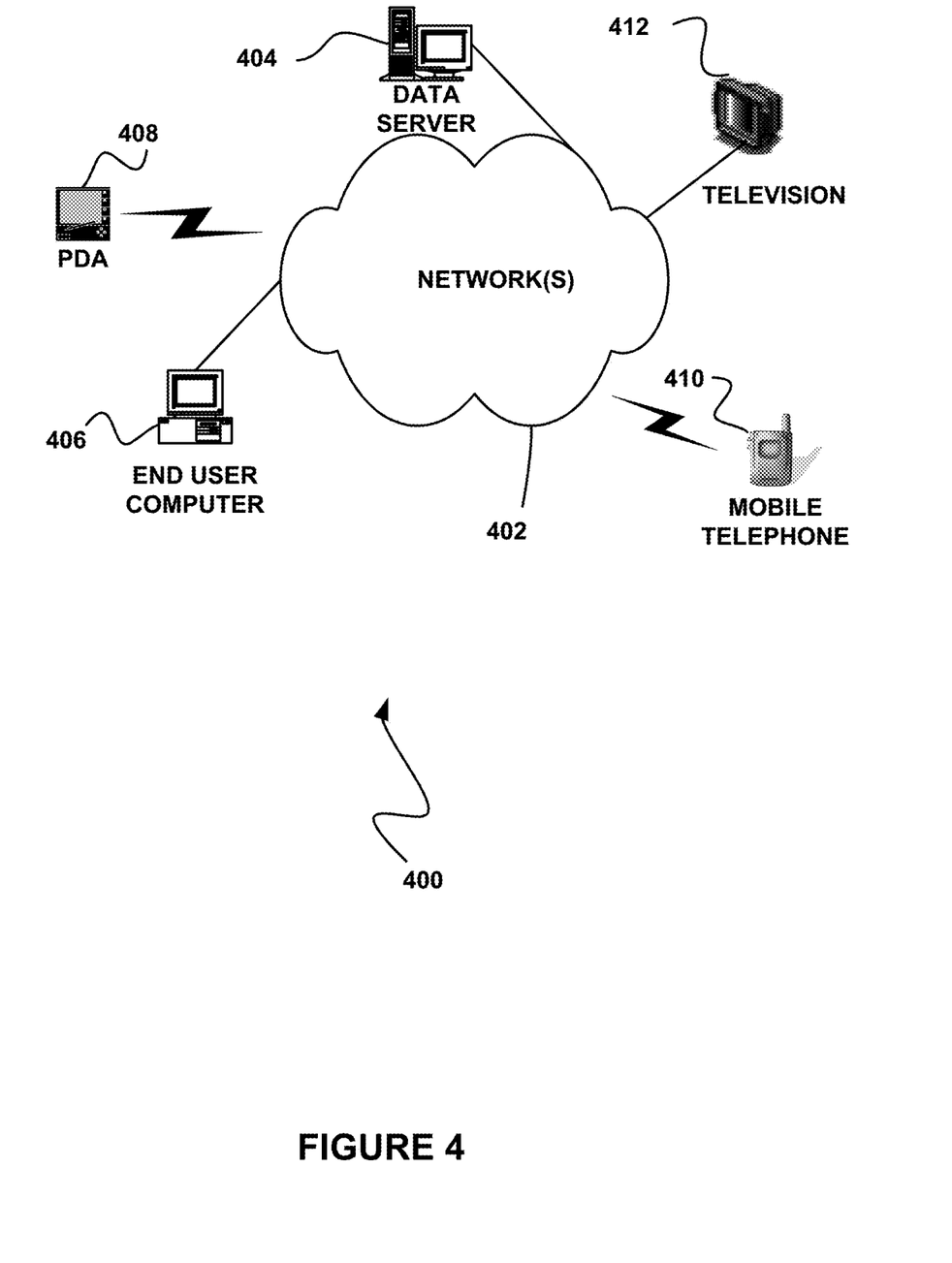
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
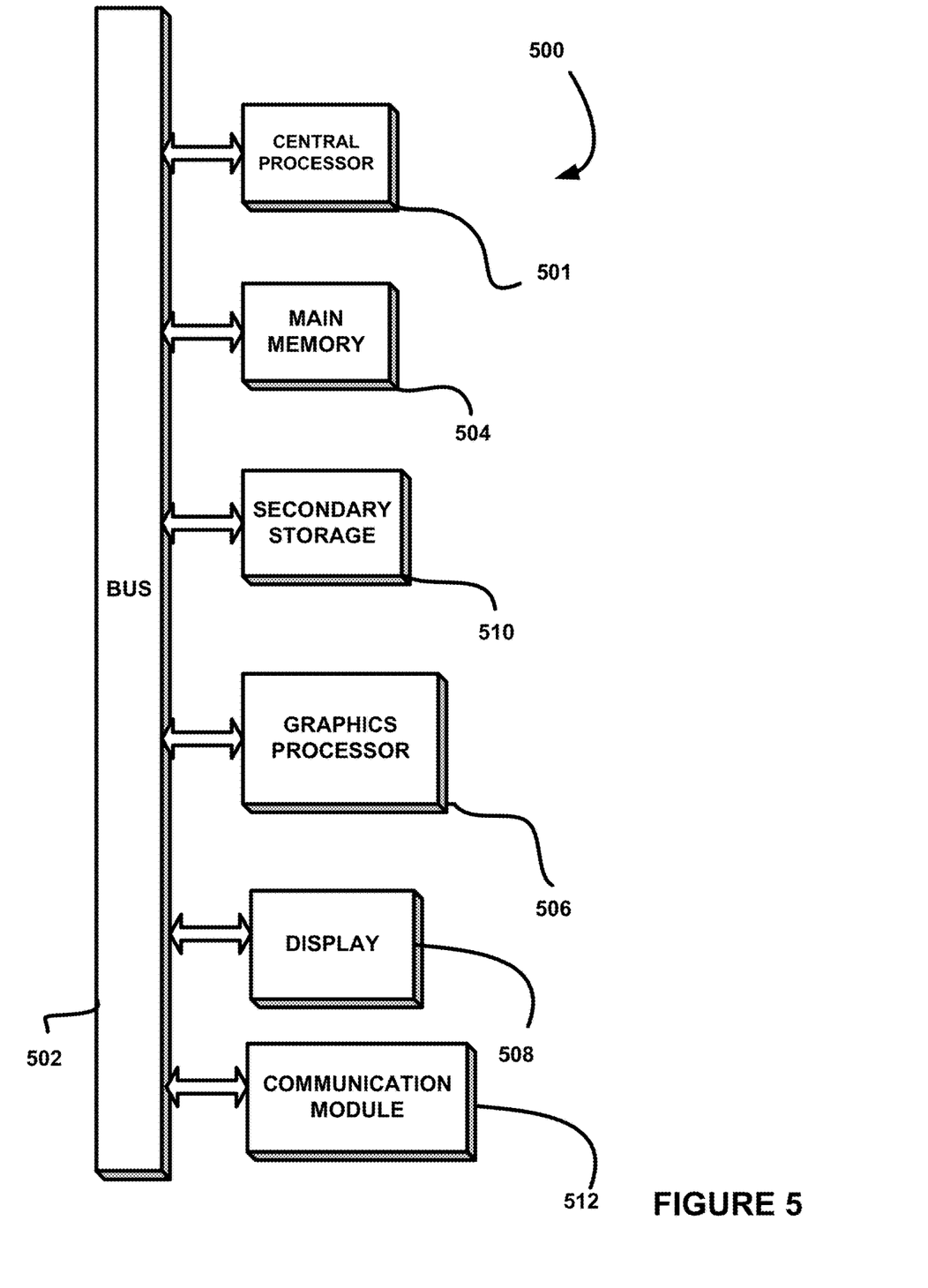
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   constructing, by a system, a machine learning model that makes automation flow predictions for incidents by:
   receiving a history of incidents as a plurality of documents that include free text fields,
   receiving a manually defined label for each historical incident in the history of incidents, wherein the manually defined label indicates one of a plurality of automation flows available in a robotic process automation (RPA) system for execution thereof that is capable of being utilized in the course of RPA to automatically resolve the historical incident,
   producing a vector representation of the plurality of documents based on a textual frequency across the free text fields, wherein the vector representation includes a plurality of words for the free text fields,
   reducing the vector representation using a dimensionality reduction code, and processing, by a machine learning algorithm, the reduced vector representation and the manually defined label received for each historical incident in the history of incidents to construct the machine learning model that is able to predict a probability that each automation flow of the plurality of automation flows is capable of being utilized in the course of RPA to automatically resolve a given incident;

receiving, by the system, incident information from at least one IT service management (ITSM) system, the incident information being free text describing an incident;

processing, by the system, the incident information using the machine learning model to classify the incident described by the incident information to a particular automation flow of the plurality of automation flows;

generating, by the system, RPA compatible information from the incident information by:
 determining required fields of the particular automation flow,
 parsing parameters associated with the incident from the free text, wherein the parameters correspond with the required fields, and
 including the parameters in the required fields of the particular automation flow, wherein the parameters associated with the incident are parsed in real time by using pattern matching between the free text and the required fields; and causing, by the system, automated resolution of the incident by triggering execution of the particular automation flow with the parameters, wherein execution of the particular automation flow with the parameters is triggered by sending, by the system to the RPA system, an application programming interface (API) with an incident identifier, the particular automation flow, and the parameters.

2. The method of claim 1, wherein the free text describing the incident includes an incident summary.

3. The method of claim 1, wherein the free text describing the incident includes incident details.

4. The method of claim 1, wherein the incident information includes an incident identifier.

5. The method of claim 1, wherein the incident is classified to the particular automation flow based on a classification code.

6. A computer program product embodied on a non-transitory computer readable medium, comprising computer code for:

constructing, by a system, a machine learning model that makes automation flow predictions for incidents by:
 receiving a history of incidents as a plurality of documents that include free text fields,
 receiving a manually defined label for each historical incident in the history of incidents, wherein the manually defined label indicates one of a plurality of automation flows available in a robotic process automation (RPA) system for execution thereof that is capable of being utilized in the course of RPA to automatically resolve the historical incident,
 producing a vector representation of the plurality of documents based on a textual frequency across the free text fields, wherein the vector representation includes a plurality of words for the free text fields,
 reducing the vector representation using a dimensionality reduction code, and
 processing, by a machine learning algorithm, the reduced vector representation and the manually defined label received for each historical incident in the history of incidents to construct the machine learning model that is able to predict a probability that each automation flow of the plurality of automation flows is capable of being utilized in the course of RPA to automatically resolve a given incident;

receiving, by the system, incident information from at least one IT service management (ITSM) system, the incident information being free text describing an incident;

processing, by the system, the incident information using the machine learning model to classify the incident described by the incident information to particular automation flow of the plurality of automation flows;

generating, by the system, RPA compatible information from the incident information by:
 determining required fields of the particular automation flow,
 parsing parameters associated with the incident from the free text, wherein the parameters correspond with the required fields, and
 including the parameters in the required fields of the particular automation flow, wherein the parameters associated with the incident are parsed in real time by using pattern matching between the free text and the required fields; and causing, by the system, automated resolution of the incident by triggering execution of the particular automation flow with the parameters, wherein execution of the particular automation flow with the parameters is triggered by sending, by the system to the RPA system, an application programming interface (API) with an incident identifier, the particular automation flow, and the parameters.

7. The computer program product of claim 6, wherein the free text describing the incident includes an incident summary.

8. The computer program product of claim 6, wherein the free text describing the incident includes incident details.

9. The computer program product of claim 6, wherein the incident information includes an incident identifier.

10. The computer program product of claim 6, wherein the incident is classified to the particular automation flow based on a classification code.

11. A system, comprising one or more processors, operable for:

constructing, by a system, a machine learning model that makes automation flow predictions for incidents by:
 receiving a history of incidents as a plurality of documents that include free text fields,
 receiving a manually defined label for each historical incident in the history of incidents, wherein the manually defined label indicates one of a plurality of automation flows available in a robotic process automation (RPA) system for execution thereof that is capable of being utilized in the course of RPA to automatically resolve the historical incident,
 producing a vector representation of the plurality of documents based on a textual frequency across the free text fields, wherein the vector representation includes a plurality of words for the free text fields,
 reducing the vector representation using a dimensionality reduction code, and
 processing, by a machine learning algorithm, the reduced vector representation and the manually defined label received for each historical incident in the history of incidents to construct the machine learning model that is able to predict a probability that each automation flow of the plurality of automation flows is capable of being utilized in the course of RPA to automatically resolve a given incident;

receiving, by the system, incident information from at least one IT service management (ITSM) system, the incident information being free text describing an incident;

processing, by the system, the incident information using the machine learning model to classify the incident described by the incident information to a particular automation flow of the plurality of automation flows;

generating, by the system, RPA compatible information from the incident information by:

determining required fields of the particular automation flow,    parsing parameters associated with the incident from the free text, wherein the parameters correspond with the required fields, and    including the parameters in the required fields of the particular automation flow, wherein the parameters associated with the incident are parsed in real time by using pattern matching between the free text and the required fields; and causing, by the system, automated resolution of the incident by triggering execution of the particular automation flow with the parameters, wherein execution of the particular automation flow with the parameters is triggered by sending, by the system to the RPA system, an application programming interface (API) with an incident identifier, the particular automation flow, and the parameters.

12. The system of claim 11, wherein the free text describing the incident includes an incident summary.

13. The system of claim 11, wherein the free text describing the incident includes incident details.

14. The system of claim 11, wherein the incident information includes an incident identifier.

15. The method of claim 1, wherein the required fields of the automation flow are determined from a reference table.

16. The method of claim 1, further comprising:

receiving, by the system, an execution result of the particular automation flow; and displaying, by the system, a result of the automated resolution, based on the execution result, for viewing by a user.

* * * * *

UNITED STATES PATENT AND TRADEMARK OFFICE
CERTIFICATE OF CORRECTION

PATENT NO. : 11,327,826 B1  
APPLICATION NO. : 15/886240  
DATED : May 10, 2022  
INVENTOR(S) : Gilli Shama et al.

Page 1 of 1

It is certified that error appears in the above-identified patent and that said Letters Patent is hereby corrected as shown below:

In the Claims

Column 10, Line 10 please replace "to particular" with --to a particular--

Signed and Sealed this  
Twentieth Day of January, 2026

John A. Squires  
*Director of the United States Patent and Trademark Office*